United States Patent [19]

Walker

[11] 3,879,299

[45] Apr. 22, 1975

[54] CONTROLLING SALT CONTAMINATED DRILLING FLUIDS BY THE ADDITION OF AN ADMIXTURE OF A WATER SOLUBLE CHROMATE AND ETHYLENE DICARBOXYLIC ACID

[75] Inventor: Thad O. Walker, Houston, Tex.

[73] Assignee: Texaco Inc., New York, N.Y.

[22] Filed: Jan. 2, 1973

[21] Appl. No.: 320,033

[52] U.S. Cl. ......... 252/8.5 B; 252/8.5 A; 252/8.5 R
[51] Int. Cl. ............................................. E21b 21/04
[58] Field of Search ............ 252/8.5 A, 8.5 R, 8.5 B

[56] References Cited
UNITED STATES PATENTS
3,654,164  4/1972  Sperry ............................. 252/8.5 A
FOREIGN PATENTS OR APPLICATIONS
6,414,645  6/1965  Netherlands ..................... 252/8.5 A Primary Examiner—Benjamin R. Padgett
Assistant Examiner—B. Hunt
Attorney, Agent, or Firm—Thomas H. Whaley; Carl G. Ries

[57] ABSTRACT

Method of controlling the rheology of a fresh water drilling fluid contaminated with salt by incorporating therein an admixture of a water soluble chromate and an ethylenedicarboxylic acid including the anhydride thereof, or mixture of said acid and the anhydride thereof in an amount of from about 0.5 to 10 pounds per barrel, a drilling method employing such a contaminated drilling fluid and containing said admixture, and a drilling fluid additive consisting of said admixture.

19 Claims, No Drawings

CONTROLLING SALT CONTAMINATED DRILLING FLUIDS BY THE ADDITION OF AN ADMIXTURE OF A WATER SOLUBLE CHROMATE AND ETHYLENE DICARBOXYLIC ACID

This invention related to a fresh water drilling fluid for drilling wells through subsurface formations by means of well drilling tools, and particularly to a drilling fluid that has been contaminated with salt in the formations, with the result that its physical properties have been substantially impaired. The invention is also concerned with a method of drilling wells employing the fresh water drilling fluid as well as an additive for the contaminated drilling fluid.

Drilling fluids, or muds as they are sometimes called, are slurries of clayey solids used in the drilling of wells for tapping underground collections of oil, gas, brine or water. SUch fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in the event of shutdowns in drilling.

An ideal drilling fluid is a thixotropic colloidal system, i.e., a fluid which on agitation or circulation (as by pumping or otherwise) has a measurable relatively low viscosity and is free-flowing (not plastic), particularly at high temperatures, but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and the proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable fresh water drilling fluids having satisfactory dispersibility, and the necessary thixotropic properties discussed above, when substantial amounts of salt are met in the formation during drilling operations. In such instances, the drilling fluid properties are materially changed and the drilling operation is interrupted to meet this situation.

One known method to control the resulting adverse properties of the drilling fluid contaminated with salt is to thin the mud by water dilution. This method is disadvantageous particularly with a weighted mud system since water dilution results in high maintenance costs. Another remedy found to be advantageous is to convert the fresh water mud to a saturated salt water mud system. However, such conversion brings with it attendant disadvantages such as closer control of the new mud system. It has now been found that the rheology of a fresh water drilling fluid contaminated with salt can be readily controlled by incorporating in said drilling fluid a mixture consisting essentially of a water soluble chromate and an ethylenedicarboxylic acid, the anhydride thereof and mixtures. The mixture is generally used in an amount of from about 0.5 to 10 pounds per barrel, preferably for the most satisfactory results, amounts between about 1 and 5 pounds per barrel.

The weight ratio of the components of the mixture should be maintained between the range of from about 0.2 to 1 part of chromate to the range of from 1 to 5 parts of the acid or its anhydride. Most desirable ranges are from 0.25 to 1 part of chromate to 1 to 4 parts of the acid or its anhydride.

Suitable water soluble chromates include ammonium, sodium, potassium chromate, strontium and calcium, ammonium, sodium and potassium dichromate, sodium chromate being preferred from a cost standpoint and relatively ready accessibility at the well site. Among the suitable ethylenedicarboxylic acids are maleic acid and the anhydride thereof, maleic anhydride, fumaric acid and mixtures thereof.

Maleic acid is particularly preferred since most beneficial results are obtained therwith in combination with sodium chromate.

The fresh water drilling fluid of the present invention contains water, a dispersed hydratable drilling clay therein, a dispersing agent for said clayey material and the prescribed amount of the ethylenedicarboxylic acid.

Any suitable clay dispersing agent may be employed in the preparation of a drilling fluid or a drilling mud reagent or additive admixture in accordance with the practice of this invention, provided, of course, it is compatible with its environment in the additive admixture and/or in the drilling mud, i.e., it is not salted out and does not undergo a chemical reaction or a physical or chemical change which would render it unsuitable or useless as a dispersing agent therein. Clay dispersing or thinning agents suitable in the practice of this invention include the lignosulfonates, such as the alkali metal lignosulfonates, the alkaline earth metal lignosulfonates and the heavy metal-containing lignosulfonates, e.g., a lignosulfonate containing both iron and chromium. A suitable heavy metal-containing lignosulfonate is Q-Broxin, a ferro-chrome lignosulfonate manufactured by the Puget Sound Pulp & Paper Company, of Bellingham, Washington. Other heavy metal-containing lignosulfonates such as iron lignosulfonate, chrome lignosulfonate, nickel lignosulfonate, lead lignosulfonate, copper lignosulfonate, manganese lignosulfonate, molybdenum lignosulfonate, ferrochrome lignosulfonate or mixtures and complexes thereof are also suitable clay dispersing agents. Other commercially available dispersing agents are also known.

The drilling fluids may also include the usual water loss additives such as a prehydrolyzed starch commercially available under the trade names Impermex and My-lo-gel, carboxymethcellulose (CMC) and the like.

The mixture of chromate and ethylenedicarboxylic acid used in the fresh water drilling fluid to restore the drilling fluid properties thereto after the drilling fluid is contaminated with a salt such as sodium or potassium chloride is as described above.

The drilling fluid additive for use in the practice of the present invention may comprise a wet or dry admixture of the chromate and the other component maleic acid, maleic acid anhydride, fumaric acid, including mixtures thereof. The dry mixture is prepared by physically admixing the chromate and said acid. The wet mixture is prepared by admixing the components in a given amount of water, which is present in an amount of from about 1 to 3 times the weight of the acid component. In addition, if desired for the most efficient results, the wet mixture can be oven dried at about 200°–300°F. for 12 to 16 hours prior to addition to the contaminated drilling fluid. The wet mixture is preferred for the most satisfactory results.

In the accompanying table the properties of the fresh water drilling fluid were determined in accordance with the established procedure set forth in the American Petroleum Institute publication (API) RP-29, Fourth Edition. Yield point (YP) is calculated by subtracting the Plastic Viscosity (PV) from the Fann Viscosity reading at 300 rpm. Plastic Viscosity (PV) is obtained by calculation, subtracting the Fann Viscosity reading at 300 rpm from the 600 rpm reading. Apparent Viscosity (AV) is equal to one-half of the Fann Viscosity reading obtained at 600 rpm. The fluidity of a drilling fluid can be back calculated from these data, the results being expressed in Fann Viscosity at 600 rpm and 300 rpm, for a direct reading viscometer.

The table sets forth representative physical properties of the drilling fluid both before and after addition of the indicated material thereto. In each example the amount of material or materials added to the drilling fluid is shown in terms of pounds per barrel of drilling fluid.

The base drilling fluid used in the tests was a top hole mud obtained from a drilling site in the West Cote Blanche Bay field. The drilling fluid was composed of the following materials and amounts. The base mud is a lightly treated top hole mud containing native solids. "Lightly treated" means the mud was treated with caustic to adjust its pH to about 9.0, and bentonite added to increase its viscosity. Thereafter the mud was treated with 6 pounds per barrel of the dispersant, "Q-Broxin," the pH adjusted to 9.5–10, and aged for 16 hours at 150°F.

TABLE I

| Example | | Amount of Additive lbs/barrel | PV cpe. | YP lbs/100 ft.$^2$ | ApVis cpe. | pH | Cl ppm. |
|---|---|---|---|---|---|---|---|
| | | Base Mud | 32.5 | 3.5 | 34.3 | 9.5 | |
| A. | | Base Mud + 5 NaCl | 33 | 37.5 | 51.8 | 9.4 | 13,100 |
| | 1. | "A" + 1 Maleic Acid + .25 NaChromate | 35 | 28 | 49 | 7.5 | |
| | 2. | "A" + 2 Maleic Acid + .50 NaChromate | 32.5 | 32.5 | 48.8 | 7.5 | |
| | 3. | "A" + 3 Maleic Acid + .75 NaChromate | 52.5 | 11 | 58 | 7.5 | |
| | 4. | "A" + 4 Maleic Acid + 1 NaChromate | 47.5 | 14 | 54.5 | 7.6 | |
| B. | | Base Mud + 10 NaCl | 25 | 77.5 | 63.8 | 9.4 | 22,200 |
| | 5. | "B" + 1 Maleic Acid + .25 NaChromate | 33 | 33 | 49.5 | 7.6 | |
| | 6. | "B" + 2 Maleic Acid + .50 NaChromate | 44.5 | 23 | 56 | 7.5 | |
| | 7. | "B" + 3 Maleic Acid + .75 NaChromate | 66.5 | 8.5 | 70.8 | 7.7 | |
| | 8. | "B" + 4 Maleic Acid + 1 NaChromate | 54 | 4 | 56 | 7.7 | |
| C. | | Base Mud + 15 NaCl | 25.5 | 87 | 69 | 9.5 | 31,350 |
| | 9. | "C" + 3 Maleic Acid + .75 NaChromate | 41 | 7.5 | 44.8 | 7.8 | |
| | 10. | "C" + 4 Maleic Acid + 1 NaChromate | 47.5 | 1 | 48 | 7.6 | |
| D. | | Base Mud + 20 NaCl | 22 | 87 | 65.5 | 9.5 | 49,350 |
| | 11. | "D" + 1 Maleic Acid + .25 NaChromate | 35.5 | 32.5 | 51.8 | 7.6 | |
| | 12. | "D" + 2 Maleic Acid + .50 NaChromate | 46 | 12.5 | 53 | 7.6 | |
| | 13. | "D" + 3 Maleic Acid + .75 NaChromate | 51 | 0.5 | 51.3 | 7.5 | |
| | 14. | "D" + 4 Maleic Acid + 1 NaChromate | 49 | 0 | 46.5 | 7.7 | |

In the above table I after the addition of the mixture to the base mud containing the contaminating salt, each of the Examples 1–14 inclusive, were aged overnight at 150°F. to condition the samples.

The base mud and the salt contaminated muds of Examples A-D inclusive were treated with sufficient aqueous caustic to adjust the mud system's pH to a value of 9.6. The pH of the Examples 1–14 was adjusted to 7.5–7.8 with caustic.

The data in the above table I show that the addition of the admixture to the salt-contaminated drilling fluid in varying amounts resulted in improving the physical properties thereof. The beneficial effects are evident over a wide range of salt concentrations.

TABLE II

| Example | Amount of Additive lbs/barrel | PV cpe. | YP lbs/100 ft.$^2$ | ApVis cpe. | pH | Cl ppm. |
|---|---|---|---|---|---|---|
| | Base Mud | 39.5 | 0 | 39.5 | 9.6 | |
| E. | Base Mud + 20 NaCl | 29.5 | 92 | 75.5 | 9.6 | |

TABLE II — Continued

| Example | Amount of Additive lbs/barrel | PV cpe. | YP lbs/100 ft.² | ApVis cpe. | pH | Cl ppm. |
| --- | --- | --- | --- | --- | --- | --- |
| 15. | "E" + 4 Mixture I⁽¹⁾ | 41 | 18 | 50 | 9.8 | |
| 16. | "E" + 4 Mixture II⁽²⁾ | 45.5 | 14.5 | 52.8 | 9.6 | |
| 17. | "E" + 4 Mixture III⁽³⁾ | 47.5 | 0 | 42.8 | 9.6 | |
| X. | "E" + 4 Mixture IV⁽⁴⁾ | 54.5 | 34 | 71.5 | 9.6 | |
| ⁽¹⁾ Mixture I | — 4 parts of Maleic Anhydride + 1 part NaChromate | | | | | |
| ⁽²⁾ Mixture II | — 50 parts of Maleic Anhydride, 12.5 parts of NaChromate, 100 parts of water, oven dried at 220°F. | | | | | |
| ⁽³⁾ Mixture III | — 50 parts of Maleic Anhydride, 12.5 parts of NaChromate, 100 parts of water. | | | | | |
| ⁽⁴⁾ Mixture IV | — "Q-Broxin" | | | | | |

The salt-contaminated base mud used in Table II, as well as all the Examples 15–17 and X, were also treated with aqueous caustic to adjust the pH to a value of 9.6, except for Example 15 where a pH of 9.8 was obtained. In addition, the test samples were aged in an oven at 150°F overnight to condition them.

The data in this Table II show the effectiveness of the dry, wet and heated mixtures of the drilling fluid additive in restoring the physical properties of the drilling fluid after contamination with 20 pounds per barrel of salt. Example X, containing the dispersant Q-Broxin, a purportedly effective clay-dispersant material in a salt contaminated drilling fluid, shows that such a material is not nearly as effective in restoring the aqueous mud system's physical properties.

I claim:

1. Method of controlling the rheology of a fresh water drilling fluid that has been contaminated with a salt selected from the group consisting of sodium chloride and potassium chloride and mixture thereof, by adding to said salt contaminated drilling mud in an amount of from about 0.5 to about 10 pounds per barrel, an admixture of a water soluble chromate and an ethylene dicarboxylic acid or an anhydride thereof, selected from the group consisting of maleic acid, fumaric acid and maleic acid anhydride, and mixtures thereof.

2. Method as claimed in claim 1 wherein said ethylenedicarboxylic acid is maleic acid.

3. Method as claimed in claim 1 wherein said ethylenedicarboxylic acid is maleic acid anhydride.

4. Method as claimed in claim 1 wherein said ethylenedicarboxylic acid is fumaric acid.

5. Method as claimed in claim 1 wherein said admixture is added in an amount of from about 1 to 5 pounds per barrel.

6. Method as claimed in claim 1 wherein said chromate is sodium chromate.

7. Method as claimed in claim 1 wherein said chromate is sodium dichromate.

8. Method as claimed in claim 1 wherein said mixture contains from 0.2 to 1 part by weight of chromate and from 1 to 5 parts by weight of said ethylenedicarboxylic acid or the anhydride thereof.

9. Method as claimed in claim 1 wherein said mixture contains from 0.25 to 1 part of sodium chromate and from 1 to 4 parts by weight of maleic acid.

10. Method as claimed in claim 1 wherein said mixture is prepared by mixing said chromate and said ethylenedicarboxylic acid or the anhydride thereof in water, and the resulting aqueous admixture is added to said drilling fluid.

11. Method as claimed in claim 10 wherein said aqueous admixture is dried at about 200°F. before being added to said drilling fluid.

12. In a method of drilling wells wherein a fresh water drilling fluid is passed through the well in contact with an earth formation during the drilling operation in contact with a salt selected from the group consisting of sodium chloride and potassium chloride and mixture thereof in the formation, the improvement which comprises contacting said earth formation with a fresh water drilling fluid containing clay solids dispersed therein by a clay dispersing agent, said drilling fluid containing from about 0.5 to about 10 pounds per barrel of drilling fluid of an admixture of sodium chromate and an ethylene dicarboxylic acid or an anhydride thereof, selected from the group consisting of maleic acid, fumaric acid and maleic acid anhydride and mixtures thereof, said admixture being effective to restore the rheology of said drilling fluid in the presence of any contaminating amounts of salt in the formation.

13. Method as claimed in claim 12 wherein said ethylenedicarboxylic acid is maleic acid.

14. Method as claimed in claim 12 wherein said ethylenedicarboxylic acid anhydride is maleic acid anhydride.

15. Method as claimed in claim 12 wherein said admixture contains said ethylenedicarboxylic acid or the anhydride thereof in an amount of from about 1 to 4 pounds.

16. Method as claimed in claim 12 wherein said admixture contains said sodium chromate in an amount of from about 0.25 to 1 pound.

17. A drilling fluid additive to restore the mud properties of a fresh water drilling fluid that has been contaminated with a salt selected from the group consisting of sodium chloride and potassium chloride and mixture thereof, which comprises an admixture of a water soluble chromate in an amount of from 0.2 to 1 part by weight and from about 1 to about 5 parts by weight of a member selected from the group consisting of maleic acid, maleic acid anhydride, fumaric acid and a mixture of maleic acid and maleic anhydride.

18. A drilling fluid additive as claimed in claim 17 wherein said admixture is a mixture of said chromate and said maleic acid in water.

19. A drilling fluid additive as claimed in claim 18 wherein said admixture is a mixture of said chromate and maleic acid in water that has been heated to a temperature of about 220°F. for 16 hours to produce a dry admixture.

* * * * *